(12) United States Patent
Kane et al.

(10) Patent No.: US 8,330,852 B2
(45) Date of Patent: Dec. 11, 2012

(54) RANGE MEASUREMENT USING SYMMETRIC CODED APERTURES

(75) Inventors: Paul J. Kane, Rochester, NY (US); Majid Rabbani, Pittsford, NY (US); Sen Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 357 days.

(21) Appl. No.: 12/770,919

(22) Filed: Apr. 30, 2010

(65) Prior Publication Data

US 2011/0267477 A1 Nov. 3, 2011

(51) Int. Cl.
*H04N 5/225* (2006.01)
(52) U.S. Cl. ........ 348/362; 348/252; 348/335; 396/138; 396/505
(58) Field of Classification Search .................. None
See application file for complete search history.

(56) References Cited

U.S. PATENT DOCUMENTS

| | | | |
|---|---|---|---|
| 8,017,899 B2* | 9/2011 | Levenets et al. | 250/208.1 |
| 2002/0075990 A1* | 6/2002 | Lanza et al. | 378/2 |
| 2002/0149691 A1* | 10/2002 | Pereira et al. | 348/335 |
| 2005/0030625 A1* | 2/2005 | Cattin-Liebl | 359/560 |
| 2008/0100717 A1* | 5/2008 | Kwon | 348/208.99 |
| 2009/0016481 A1* | 1/2009 | Slinger | 378/2 |
| 2009/0020714 A1* | 1/2009 | Slinger | 250/550 |
| 2009/0028451 A1 | 1/2009 | Slinger et al. | |
| 2009/0090868 A1* | 4/2009 | Payne | 250/363.06 |
| 2010/0110179 A1* | 5/2010 | Zalevsky et al. | 348/135 |
| 2010/0220212 A1* | 9/2010 | Perlman et al. | 348/229.1 |

OTHER PUBLICATIONS

Sazbon, D., et al. "Qualitative Real-Time Range Extraction for Preplanned Scene Partitioning Using Laser Beam Coding," Apr. 29, 2005, Pattern Recognition Letters, vol. 26, 2005.*
Hiura, S., et al. "Depth Measurement by the Multi-Focus Camera," Jun. 23, 1998, 1998 IEEE Computer Society Conference on Computer Vision and Pattern Recognition, p. 953-959.*
V.M. Bove, Pictorial Applications for Range Sensing Cameras, SPIE vol. 901, pp. 10-17, 1988.
J.W. Goodman, Introduction to Fourier Optics, MCGraw-Hill, San Francisco, 1968, pp. 113-117.
Veeraraghaven et al, Dappled Photography: Mask Enhanced Cameras for heterodyned Light Fields and Coded Aperture refocusing, ACM Transactions on graphics 26 (3), Jul. 2007, paper 69.
Levin et al, Image and Depth from a Conventional camera with a Coded Aperture, ACM Transactions on Graphics 26 (3), Jul. 2007, paper 70.
Dr. Arthur Cox, A Survey of Zoom Lenses, SPIE vol. 3129,0277-786x/97.
S.K. Nayer, et al, Real Time Focus Range Sensor, IEEE Transactions of Pattern Analysis and Machine Intelligence, vol. 18, No. 12, Dec. 1996, p. 1186-1198.

(Continued)

*Primary Examiner* — Chieh M Fan
*Assistant Examiner* — Dwight C Tejano
(74) *Attorney, Agent, or Firm* — Raymond L. Owens

(57) ABSTRACT

A method of using an image capture device to identify range information for objects in a scene includes providing an image capture device having an image sensor, a coded aperture having circular symmetry, and a lens; storing in a memory a set of blur parameters derived from range calibration data; capturing images of the scene having a plurality of objects; producing a set of reference edge images using the blur parameters from the stored set; providing a set of deblurred images using the captured image, the reference edges and each of the blur parameters from the stored set; and using the set of deblurred images to determine the range information for the objects in the scene.

15 Claims, 10 Drawing Sheets

OTHER PUBLICATIONS

A.N. Rajagopalan et al.: "An MRF Model-Based Approach to Simultaneous Recovery of Depth and Restoration From Defocused Images", IEEE Transactions on Pattern Analysis and Machine Intelligence, IEEE Service Center, Los Alamitos, CA, US, vol. 21, No. 7, Jul. 1, 1999, pp. 577-589, XP000832594, ISSN: 0162-8828, DOI: DOI: 10.1109/34.777369, the whole document.

* cited by examiner

RANGE MEASUREMENT USING SYMMETRIC CODED APERTURES

CROSS REFERENCE TO RELATED APPLICATIONS

Reference is made to commonly assigned, co-pending U.S. patent application Ser. No. 12/612,135, filed Nov. 4, 2009, entitled "Image deblurring using a combined differential image", by Sen Weng, et al, co-pending U.S. patent application Ser. No. 12/770,810, filed concurrently herewith and entitled "Range measurement using coded aperture", by Paul J. Kane, et al, co-pending U.S. patent application Ser. No. 12/770,822 filed concurrently herewith and entitled "Range measurement using multiple coded apertures", by Paul J. Kane, et al, co-pending U.S. patent application Ser. No. 12/770,830 filed concurrently herewith and entitled Range measurement using a zoom camera, by Paul J. Kane, et al, and co-pending U.S. patent application Ser. No. 12/770,894, filed concurrently herewith and entitled Digital camera with coded aperture range finder, by Paul J. Kane, et al, all of which are incorporated herein by reference.

FIELD OF THE INVENTION

The present invention relates to an image capture device that is capable of determining range information for objects in a scene, and in particular a capture device that uses a coded aperture and computational algorithms to efficiently determine the range information.

BACKGROUND OF THE INVENTION

Optical imaging systems are designed to create a focused image of scene objects over a specified range of distances. The image is in sharpest focus in a two dimensional (2D) plane in the image space, called the focal or image plane. From geometrical optics, a perfect focal relationship between a scene object and the image plane exists only for combinations of object and image distances that obey the thin lens equation:

$$\frac{1}{f} = \frac{1}{s} + \frac{1}{s'} \tag{1}$$

where f is the focal length of the lens, s is the distance from the object to the lens, and s' is the distance from the lens to the image plane. This equation holds for a single thin lens, but it is well known that thick lenses, compound lenses and more complex optical systems are modeled as a single thin lens with an effective focal length f. Alternatively, complex systems are modeled using the construct of principal planes, with the object and image distances s, s' measured from these planes, using the effective focal length in the above equation, hereafter referred to as the lens equation.

It is also known that once a system is focused on an object at distance $s_1$, in general only objects at this distance are in sharp focus at the corresponding image plane located at distance $s_1'$. An object at a different distance $s_2$ produces its sharpest image at the corresponding image distance $s_2'$, determined by the lens equation. If the system is focused at $s_1$, an object at $s_2$ produces a defocused, blurred image at the image plane located at $s_1'$. The degree of blur depends on the difference between the two object distances, $s_1$ and $s_2$, the focal length f of the lens, and the aperture of the lens as measured by the f-number, denoted f/#. For example, FIG. 1 shows a single lens 10 with clear aperture of diameter D. The on-axis point $P_1$ of an object located at distance $s_1$ is imaged at point $P_1'$ at distance $s_1'$ from the lens. The on-axis point $P_2$ of an object located at distance $s_2$ is imaged at point $P_2'$ at distance $s_2'$ from the lens. Tracing rays from these object points, axial rays 20 and 22 converge on image point $P_1'$, while axial rays 24 and 26 converge on image point $P_2$, then intercept the image plane of $P_1'$ where they are separated by a distance d. In an optical system with circular symmetry, the distribution of rays emanating from $P_2$ over all directions results in a circle of diameter d at the image plane of $P_1'$, which is called the blur circle or circle of confusion.

On axis point $P_1$ moves farther from the lens, tending towards infinity, it is clear from the lens equation that $s_1'=f$. This leads to the usual definition of the f-number as f/#=f/D. At finite distances, the working f-number is defined as $(f/\#)_w=f/s_1'$. In either case, it is clear that the f-number is an angular measure of the cone of light reaching the image plane, which in turn is related to the diameter of the blur circle d. In fact, it is shown that $$d = \frac{f}{(f/\#)s_2'}|s_2' - s_1'|. \tag{2}$$

By accurate measure of the focal length and f-number of a lens, and the diameter d of the blur circle for various objects in a two dimensional image plane, in principle it is possible to obtain depth information for objects in the scene by inverting the Eq. (2), and applying the lens equation to relate the object and image distances. This requires careful calibration of the optical system at one or more known object distances, at which point the remaining task is the accurate determination of the blur circle diameter d.

The above discussion establishes the principles behind passive optical ranging methods based on focus. That is, methods based on existing illumination (passive) that analyze the degree of focus of scene objects and relate this to their distance from the camera. Such methods are divided into two wide categories: depth from defocus methods assume that the camera is focused once and that a single image is captured and analyzed for depth, whereas depth from focus methods assume that multiple images are captured at different focus positions and the parameters of the different camera settings are used to infer the depth of scene objects.

The method presented above provides insight into the problem of depth recovery, but unfortunately is oversimplified and not robust in practice. Based on geometrical optics, it predicts that the out-of-focus image of each object point is a uniform circular disk or blur circle. In practice, diffraction effects and lens aberrations lead to a more complicated light distribution, characterized by a point spread function (psf), specifying the intensity of the light at any point (x,y) in the image plane due to a point light source in the object plane. As explained by Bove (V. M. Bove, *Pictorial Applications for Range Sensing Cameras*, SPIE vol. 901, pp. 10-17, 1988), the defocusing process is more accurately modeled as a convolution of the image intensities with a depth-dependent psf:

$$i_{def}(x,y;z)=i(x,y)*h(x,y;z), \tag{3}$$

where $i_{def}(x,y;z)$ is the defocused image, $i(x,y)$ is the in-focus image, $h(x,y;z)$ is the depth-dependent psf and * denotes convolution. In the Fourier domain, this is written:

$$I_{def}(v_x,v_y)=I(v_x,v_y)H(v_x,v_y;z), \tag{4}$$

where $I_{def}(v_x, v_y)$ is the Fourier transform of the defocused image, $i(v_x, v_y)$ is the Fourier transform of the in-focus image, $H(v_x, v_y; z)$ is the Fourier transform of the depth-dependent psf, and $v_x$, $v_y$ are two dimensional spatial frequencies. Note that the Fourier Transform of the psf is the Optical Transfer Function, or OTF. Bove describes a depth-from-focus method, in which it is assumed that the psf is circularly symmetric, i.e. $h(x,y; z)=h(r; z)$ and $H(v_x, v_y; z)=H(\rho; z)$, where r and $\rho$ are radii in the spatial and spatial frequency domains, respectively. Two images are captured, one with a small camera aperture (long depth of focus) and one with a large camera aperture (small depth of focus). The Discrete Fourier Transform (DFT) is taken of corresponding windowed blocks in the two images, followed by a radial average of the resulting power spectra, meaning that an average value of the spectrum is computed at a series of radial distances from the origin in frequency space, over the 360 degree angle. At that point the radially averaged power spectra of the long and short depth of field (DOF) images are used to compute an estimate for $H(\rho, z)$ at corresponding windowed blocks, assuming that each block represents a scene element at a different distance z from the camera. The system is calibrated using a scene containing objects at known distances $[z_1, z_2, \ldots z_n]$ to characterize $H(\rho; z)$, which then is related to the blur circle diameter. A regression of the blur circle diameter vs. distance z then leads to a depth or range map for the image, with a resolution corresponding to the size of the blocks chosen for the DFT.

Methods based on blur circle regression have been shown to produce reliable depth estimates. Depth resolution is limited by the fact that the blur circle diameter changes rapidly near focus, but very slowly away from focus, and the behavior is asymmetric with respect to the focal position. Also, despite the fact that the method is based on analysis of the point spread function, it relies on a single metric (blur circle diameter) derived from the psf.

Other depth from defocus methods seek to engineer the behavior of the psf as a function of defocus in a predictable way. By producing a controlled depth-dependent blurring function, this information is used to deblur the image and infer the depth of scene objects based on the results of the deblurring operations. There are two main parts to this problem: the control of the psf behavior, and deblurring of the image, given the psf as a function of defocus.

The psf behavior is controlled by placing a mask into the optical system, typically at the plane of the aperture stop. For example, FIG. 2 shows a schematic of an optical system from the prior art with two lenses 30 and 34, and a binary transmittance mask 32, including an array of holes, placed in between. In most cases, the mask is the element in the system that limits the bundle of light rays that propagate from an axial object point and is therefore, by definition, the aperture stop. If the lenses are reasonably free from aberrations, the mask, combined with diffraction effects, will largely determine the psf and OTF (see J. W. Goodman, *Introduction to Fourier Optics*, McGraw-Hill, San Francisco, 1968, pp. 113-117). This observation is the working principle behind the encoded blur or coded aperture methods. In one example of the prior art, Veeraraghavan et. al. (*Dappled Photography: Mask Enhanced Cameras for Heterodyned Light Fields and Coded Aperture Refocusing*, ACM Transactions on Graphics 26 (3), July 2007, paper 69) demonstrate that a broadband frequency mask composed of square, uniformly transmitting cells can preserve high spatial frequencies during defocus blurring. By assuming that the defocus psf is a scaled version of the aperture mask, a valid assumption when diffraction effects are negligible, the authors show that depth information is obtained by deblurring. This requires solving the deconvolution problem, i.e. inverting Eq. (3) to obtain h(x,y; z) for the relevant values of z. In principle, it is easier to invert the spatial frequency domain counterpart of Eq. (3), i.e. Eq. (4), which is done at frequencies for which $H(v_x, v_y; z)$ is nonzero.

In practice, finding a unique solution for deconvolution is well known as a challenging problem. Veeraraghavan et. al. solve the problem by first assuming the scene is composed of discrete depth layers, and then forming an estimate of the number of layers in the scene. Then, the scale of the psf is estimated for each layer separately, using the model $$h(x,y,z)=m(k(z)x/w, k(z)y/w), \quad (5)$$

where m(x,y) is the mask transmittance function, k(z) is the number of pixels in the psf at depth z, and w is the number of cells in the 2D mask. The authors apply a model for the distribution of image gradients, along with Eq. (5) for the psf, to deconvolve the image once for each assumed depth layer in the scene. The results of the deconvolutions are desirable only for those psfs whose scale they match, thereby indicating the corresponding depth of the region. These results are limited in scope to systems behaving according to the mask scaling model of Eq. (5), and masks composed of uniform, square cells.

Levin et. al. in *Image and Depth from a Conventional Camera with a Coded Aperture*, ACM Transactions on Graphics 26 (3), July 2007, paper 70) follow a similar approach to Veeraraghavan, however, Levin et. al. rely on direct photography of a test pattern at a series of defocused image planes, to infer the psf as a function of defocus. Also, Levin et. al. investigated a number of different mask designs in an attempt to arrive at an optimum coded aperture. They assume a Gaussian distribution of sparse image gradients, along with a Gaussian noise model, in their deconvolution algorithm. Therefore, the optimized coded aperture solution is dependent on assumptions made in the deconvolution analysis.

Other techniques that rely on the circular symmetry of the psf, but do not use a coded aperture, include the approach described by Nayar et. al. in *Real-Time Focus Range Sensor*, IEEE Transactions on Pattern Analysis and Machine Intelligence 18 (12), 1186-1198 (1996). This method uses two captures of the scene at two focus positions, along with a focus measure, to infer depth of scene objects. In another example, Aslantas et. al. in *Depth from Automatic Defocusing*, Optics Express 15(3), 1011-1023 (2007) describe a technique in which a focused, or defocused image is captured, at certain camera parameters or settings. One or more camera parameters are then changed, which alters the sharpness of the original image. Next, one or more camera parameters are changed (that is, one of the parameters that was not altered previously), with the aim of restoring the image to its original sharpness, and a second image is captured. The camera parameters are altered iteratively until the sharpness match with respect to the original capture is achieved. Equations are given that relate the camera parameters to the change in depth.

SUMMARY OF THE INVENTION

The present invention represents a method of using a capture device to identify range information for objects in a scene, comprising:

a) providing an image capture device having an image sensor, a coded aperture having circular symmetry, and a lens;

b) storing in a memory a set of blur parameters derived from range calibration data;

c) capturing an image of the scene having a plurality of objects;

d) producing a set of reference edge images using the blur parameters from the stored set;

e) providing a set of deblurred images using the captured image, the reference edges and each of the blur parameters from the stored set; and f) using the set of deblurred images to determine the range information for the objects in the scene.

This invention has the advantage that it produces range estimates based on capture devices with a coded aperture having circular symmetry, which has an identical effect on edges at any orientation, which is used to improve the image deblurring process that is in turn used to produce improved range estimates.

DETAILED DESCRIPTION OF THE INVENTION

In the following description, some arrangements of the present invention will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein are selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the arrangements described herein. References to "a particular arrangement" and the like refer to features that are present in at least one arrangement of the invention. Separate references to "an arrangement" or "particular arrangements" or the like do not necessarily refer to the same arrangement or arrangements; however, such arrangements are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 3:
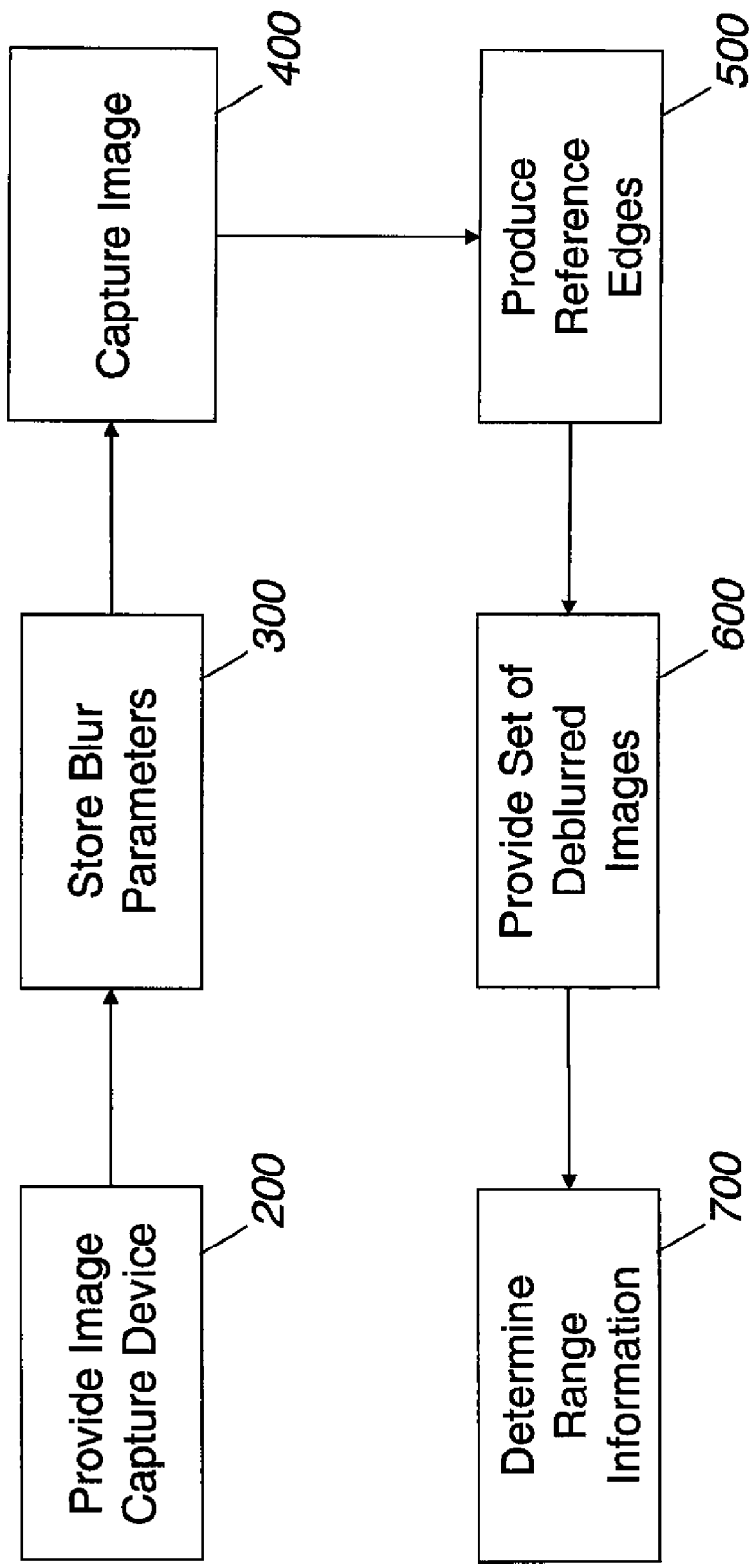
FIG. 3 is flow chart showing the steps of a method of using an image capture device to identify range information for objects in a scene according to one embodiment of the present invention.

FIG. 3 is a flow chart showing the steps of a method of using an image capture device to identify range information for objects in a scene according to one arrangement of the present invention. The method includes the steps of: providing an image capture device 200 having an image sensor, a coded aperture, and a lens; storing in a memory 300 a set of blur parameters derived from range calibration data; capturing an image 400 of the scene having a plurality of objects; producing a set of reference edge images 500 derived from the range calibration data and the blur parameters; providing a set of deblurred images 600 using the capture image, each of the blur parameters from the stored set, and the edge images; and using the set of blurred images to determine the range information 700 for objects in the scene.

Figure 1:
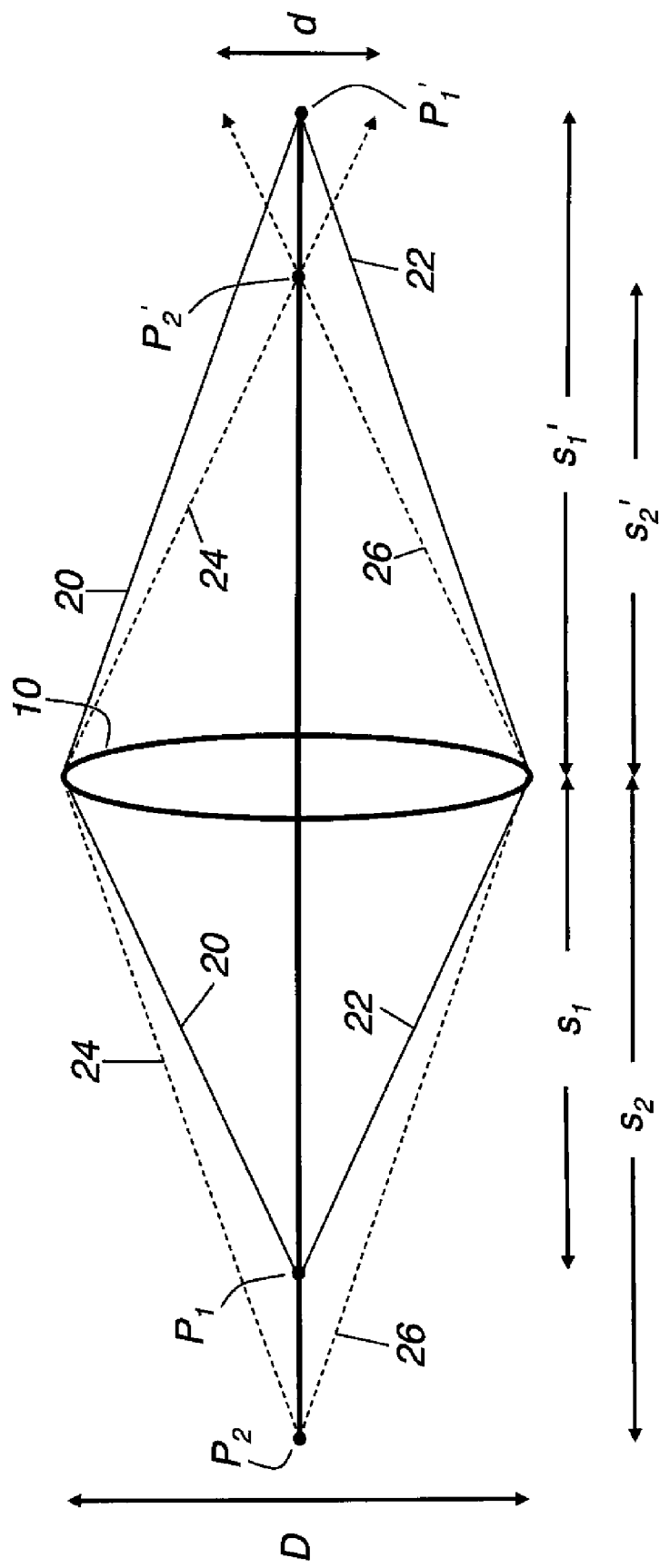
FIG. 1 is a schematic of a single lens optical system as known in the prior art.
Figure 2:
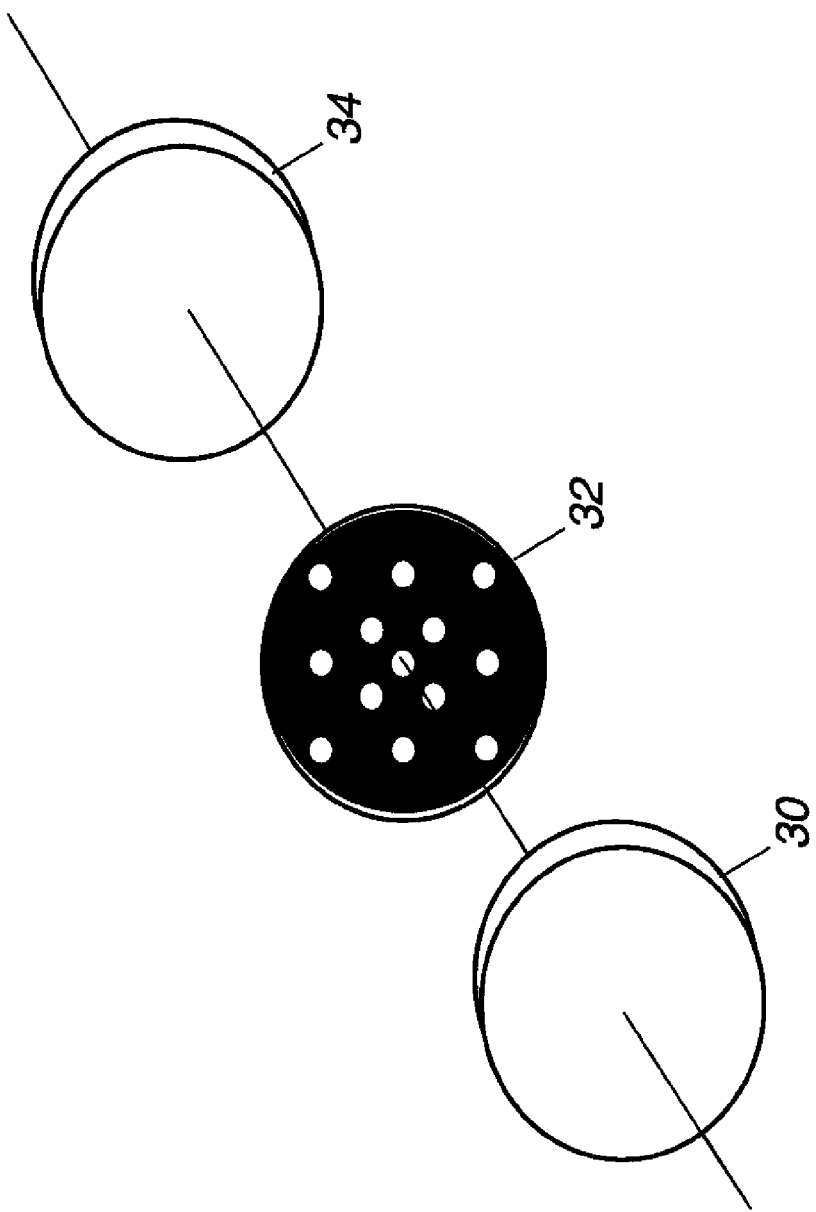
FIG. 2 is a schematic of an optical system with a coded aperture mask as known in the prior art.
Figure 4:
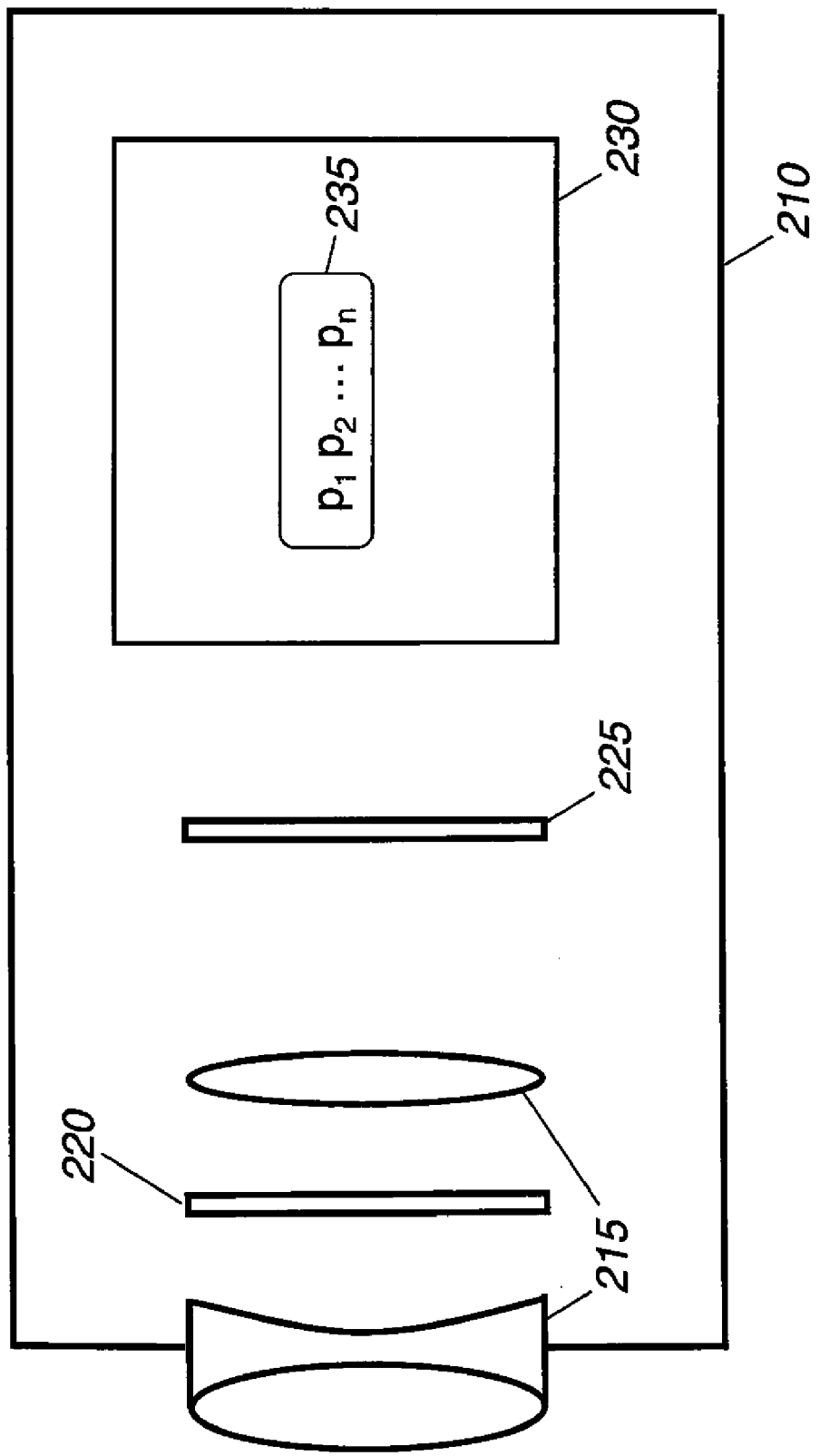
FIG. 4 is a schematic of a capture device according to one embodiment of the present invention.

An image capture device includes one or more image capture devices that implement the methods of the various arrangements of the present invention, including the example image capture devices described herein. The phrases "image capture device" or "capture device" are intended to include any device including a lens which forms a focused image of a scene at an image plane, wherein an electronic image sensor is located at the image plane for the purposes of recording and digitizing the image, and which further includes a coded aperture or mask located between the scene or object plane and the image plane. These include a digital camera, cellular phone, digital video camera, surveillance camera, web camera, television camera, multimedia device, or any other device for recording images. FIG. 4 shows a schematic of one such capture device according to one arrangement of the present invention. The capture device 210 includes a lens 215, shown here as a compound lens including multiple elements, a coded aperture 220, and an electronic sensor array 225. Preferably, the coded aperture is located at the aperture stop of the optical system, or one of the images of the aperture stop, which are known in the art as the entrance and exit pupils. This can necessitate placement of the coded aperture in between elements of a compound lens, as illustrated in FIG. 2, depending on the location of the aperture stop. The coded aperture 220 is of the light absorbing type, so as to alter only the amplitude distribution across the optical wavefronts incident upon it, or the phase type, so as to alter only the phase delay across the optical wavefronts incident upon it, or of mixed type, so as to alter both the amplitude and phase.

The step of storing in a memory a set of blur parameters 300 refers to storing a representation of the psf of the image capture device 210 for a series of object distances and defocus distances. Storing the blur parameters 300 includes storing a digitized representation of the psf, specified by discrete code values in a two dimensional matrix. It also includes storing mathematical parameters derived from a regression or fitting function that has been applied to the psf data, such that the psf values for a given (x,y,z) location are readily computed from the parameters and the known regression or fitting function. Such memory can include computer disk, ROM, RAM or any other electronic memory known in the art. Such memory can reside inside the camera, or in a computer or other device electronically linked to the camera. In the arrangement shown in FIG. 4, the memory 230 storing blur parameters 235 $[p_1, p_2, \ldots p_n]$ is located inside the camera 210.

Figure 5:
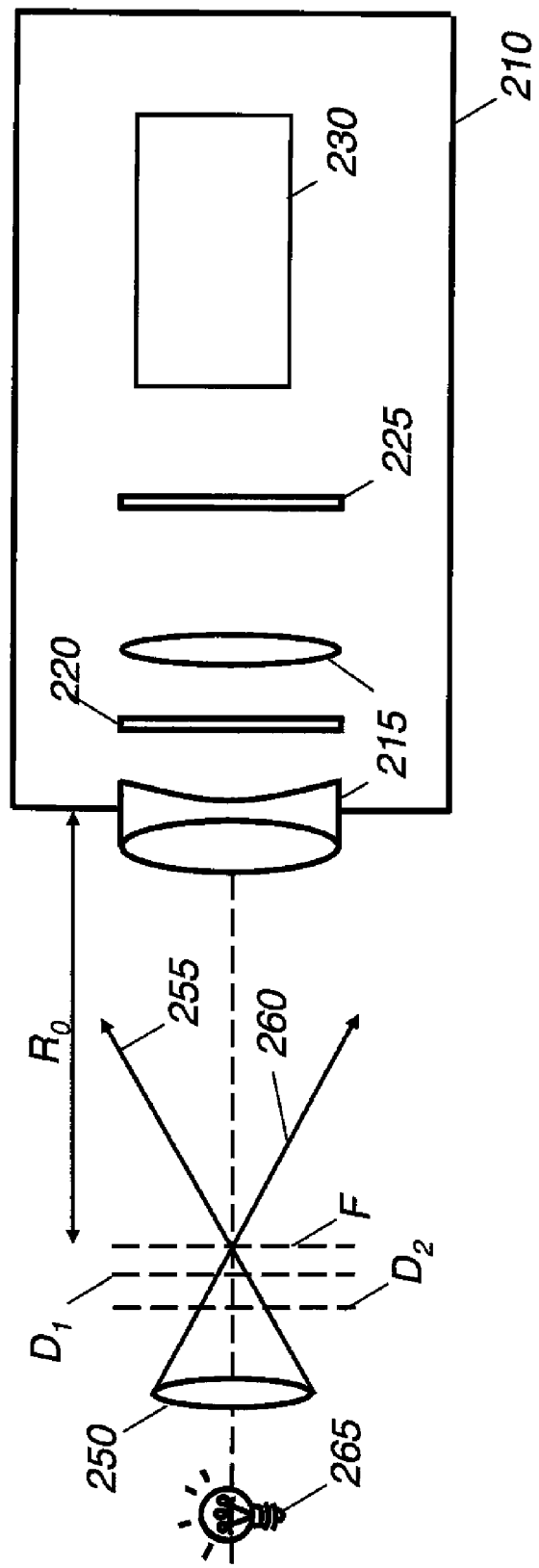
FIG. 5 is a schematic of a laboratory setup for obtaining blur parameters for one object distance and a series of defocus distances according to one embodiment of the present invention.

FIG. 5 is a schematic of a laboratory setup for obtaining blur parameters for one object distance and a series of defocus distances in accord with the present invention. A simulated point source includes a light source 265 focused by condenser optics 250 at a point on the optical axis intersected by a focal plane F, coinciding with the plane of focus of the image capture device 210, located at object distance $R_0$ from the image capture device. The light rays 255 and 260 passing through the point of focus appear to emanate from a point source located on the optical axis at distance $R_0$ from the camera. Thus the image of this light captured by the image capture device 210 is a record of the image capture device 210 psf at object distance $R_0$. The defocused psf for objects at other distances from the image capture device 210 is captured by moving the source 265 and condenser lens 250 (in this example, to the left) together so as to move the location of the effective point source to other planes, for example $D_1$ and $D_2$, while maintaining the image capture device 210 focus position at plane F. The distances (or range data) from the image capture device 210 to planes F, $D_1$ and $D_2$ are then recorded along with the psf images to complete the set of range calibration data.

Returning to FIG. 3, the step of capturing an image of the scene 400 includes capturing one image of the scene or two or more images of the scene in a digital image sequence, also known in the art as a motion or video sequence. In this way the method includes the ability to identify range information for one or more moving objects in a scene. This is accomplished by determining range information 700 for each image in the sequence, or by determining range information for some subset of images in the sequence. In some arrangements, a subset of images in the sequence is used to determine range information for one or more moving objects in the scene, as long as the time interval between the images chosen is sufficiently small to resolve significant changes in the depth or z-direction. That is, this will be a function of the objects' speed in the z-direction and the original image capture interval, or frame rate. In other arrangements, the determination of range information for one or more moving objects in the scene is used to identify stationary and moving objects in the scene. This is especially advantageous if the moving objects have a z-component to their motion vector, i.e. their depth changes with time, or image frame. Stationary objects are identified as those objects for which the computed range values are unchanged with time, after accounting for motion of the camera, whereas moving objects have range values that can change with time. In yet another arrangement, the range information associated with moving objects is used by an image capture device to track such objects.

Figure 6:
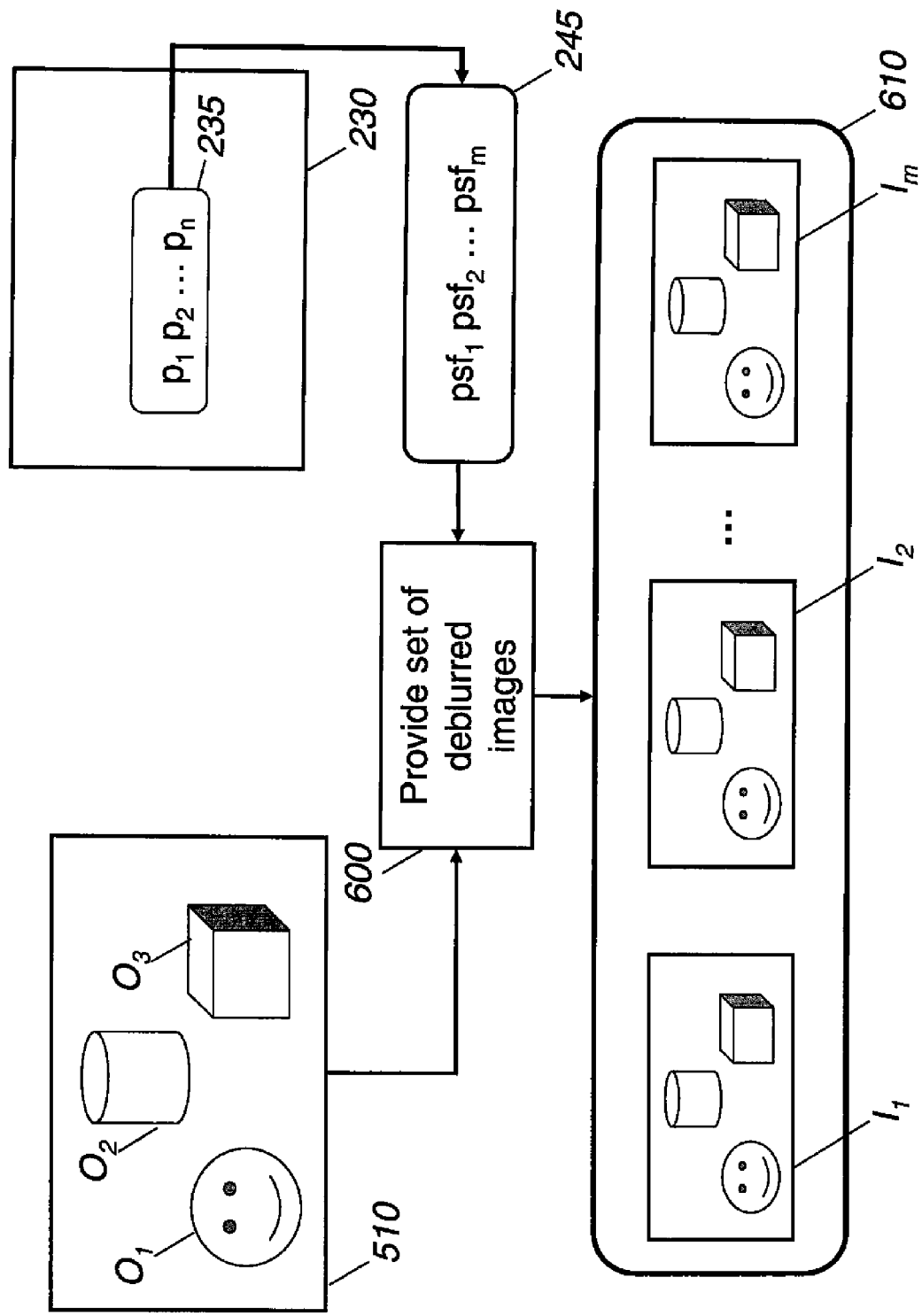
FIG. 6 is a process diagram illustrating a method for using a captured image and blur parameters to provide a set of deblurred images, according to one embodiment of the present invention.

FIG. 6 shows a process diagram in which a captured image 510 and blur parameters 235 stored in a memory 230 are used to provide a set of deblurred images 610. The blur parameters are a set of two dimensional matrices that approximate the psf of the image capture device 210 for the distance at which the image was captured, and a series of defocus distances covering the range of objects in the scene. Alternatively, the blur parameters are mathematical parameters from a regression or fitting function as described above. In either case, a digital representation of the point spread functions 245 that span the range of object distances of interest in the object space are computed from the blur parameters, represented in FIG. 6 as the set $[psf_1, psf_2, \ldots psf_m]$. In the preferred embodiment, there is a one-to-one correspondence between the blur parameters 235 and the set of digitally represented psfs 245. In some arrangements, there is not a one-to-one correspondence. In some arrangements, digitally represented psfs at defocus distances for which blur parameter data has not been recorded is computed by interpolating or extrapolating blur parameter data from defocus distances for which blur parameter data is available.

The digitally represented psfs 245 are used in a deconvolution operation to provide a set of deblurred images 600. The captured image 510 is deconvolved m times, once for each of m elements in the set 245, to create a set of in deblurred images 610. The deblurred image set 610, whose elements are denoted $[I_1, I_2, \ldots I_m]$, is then further processed with reference to the original captured image 510, to determine the range information 700 for the objects in the scene.

Figure 7:
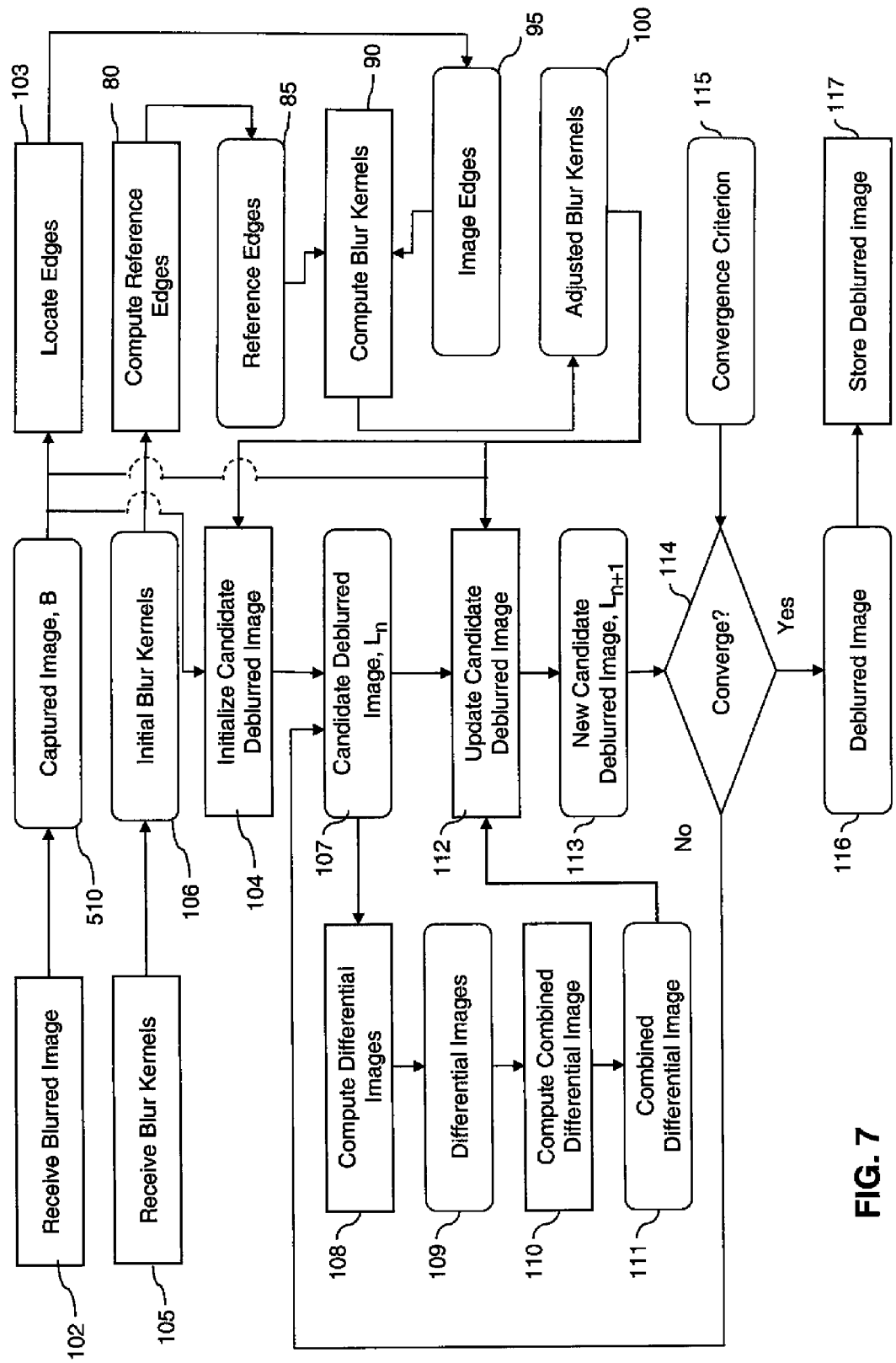
FIG. 7 is a process diagram illustrating a method for deblurring a single image according to one embodiment of the present invention.

The step of providing a set of deblurred images 600 will now be described in further detail with reference to FIG. 7, which illustrates the process of deblurring a single image using the set 245 of psfs in accordance with the present invention. As is known in the prior art, relating to the problem of deblurring and deconvolution, the image to be deblurred is referred to as the blurred image, and the psf representing the blurring effects of the camera system is referred to as the blur kernel. In FIG. 7, a receive blur kernels step 105 is used to receive a set of initial blur kernels 106. In the preferred embodiment, the set of initial blur kernels is the set of psfs 245. Each blur kernel is a convolution kernel that is applied to a sharp image of a scene to produce an image having sharpness characteristics approximately equal to one or more objects within the captured image 510 of the scene, depending on the objects' degree of defocus, or equivalently, the objects' distance from the point of acceptable focus. The initial blur kernels 106 are each applied to a model step edge to compute reference edges 80, which represent the effect that the camera system, including the coded aperture 220, would have on an edge at the series of defocus positions used to obtain the psf data. An important advantage of the present invention is that since the coded aperture 220 has circular symmetry, the resulting reference edge set 85 is representative of any edge in the scene, at any orientation. The model step edge has the mathematical form:

$$y = \begin{cases} 0 & x < 0 \\ 1/2 & x = 0 \\ 1 & x > 0 \end{cases} \quad (6)$$

where x is the spatial coordinate and y is the edge height, and the edge transition is located at x=0. In the computation of the reference edge set, it is preferred that the model step edge, and the resulting reference edges, be spatially sampled at the same rate or pixel density as the captured images.

A receive blurred image step 102 is used to receive the captured image 510 of the scene. Next, a locate edges step 103 is used to identify and sort the edges in the scene. Any method is used to detect edges in the image, including the Sobel, Laplacian of Gaussian, Canny, and zero-crossing methods, and others known in the art. Once the edges have been detected, they are sorted into groups by edge profile, which is indicative of the amount of defocus that the edge has suffered during capture. An important advantage of the present invention is that the coded aperture 220 removes ambiguity between soft edges in the scene that suffered minor defocus, and hard edges in the scene that suffered large defocus. Next, a compute blur kernel step 90 compares the sorted image edge profiles 95 with the reference edges 85 to determine the correlation between the reference and image edges. If there is an effective good match between the two sets, that is, if many edges in the image match most of the elements of the reference set, then the set of initial blur kernels 106 is used without modification to create the deblurred image set 610, and step 90 simply passes on the blur kernels 106 to the set of adjusted blur kernels 100. If there is not an effective match between the two sets, that is, if most of the edges in the image do not match the elements of the reference set, then in accord with the present invention, step 90 interpolates a new set of adjusted blur kernels 100 that yield an improved match between the edges in the image and in the reference set. This set of adjusted blur kernels 100 is computed using interpolation, regression or other modeling techniques. The adjusted kernels 100 are a better match for the actual depth planes in the scene that was captured, relative to the depth planes that were used to characterize the image capture device 210, and thus lead to an improved deblurred image set and improved range estimates based upon this deblurred image set 610.

The remaining sequence of processing steps is executed once for each member of the adjusted blur kernel set 100. First, an initialize candidate deblurred image step 104 is used to initialize a candidate deblurred image 107 using the captured image 510 and one of the blur kernels from step 90. In the preferred embodiment, any deconvolution algorithm known to those in the art is used to process the captured image 510 using a blur kernel from step 90, and the candidate deblurred image 107 is then initialized by setting it equal to the processed image. Examples of such deconvolution algorithms would include conventional frequency domain filtering algorithms such as the well-known Richardson-Lucy (RL) deconvolution method described in the background section. In other arrangements, where the captured image 510 is part of an image sequence, a difference image is computed between the current and previous image in the image sequence, and the candidate deblurred image is initialized with reference to this difference image. For example, if the difference between successive images in the sequence is currently small, the candidate deblurred image would not be reinitialized from its previous state, saving processing time. The reinitialization is saved until a significant difference in the sequence is detected. In other arrangements, only selected regions of the candidate deblurred image are reinitialized if significant changes in the sequence are detected in only selected regions. In another arrangement, the range information is only determined for selected regions or objects in the scene where a significant difference in the sequence is detected, thus saving processing time.

Next a compute differential images step 108 is used to determine a plurality of differential images 109. The differential images 109 can include differential images computed by calculating numerical derivatives in different directions (e.g., x and y) and with different distance intervals (e.g., $\Delta x=1, 2, 3$). A compute combined differential image step 110 is used to form a combined differential image 111 by combining the differential images 109.

Next an update candidate deblurred image step 112 is used to compute a new candidate deblurred image 113 responsive to the blurred image 116, the blur kernel 106, the candidate deblurred image 107, and the combined differential image 111. As will be described in more detail later, in a preferred embodiment of the present invention, the update candidate deblurred image step 112 employs a Bayesian inference method using Maximum-A-Posterior (MAP) estimation.

Next, a convergence test 114 is used to determine whether the deblurring algorithm has converged by applying a convergence criterion 115. The convergence criterion 115 is specified in any appropriate way known to those skilled in the art. In a preferred embodiment of the present invention, the convergence criterion 115 specifies that the algorithm is terminated if the mean square difference between the new candidate deblurred image 113 and the candidate deblurred image 107 is less than a predetermined threshold. Alternate forms of convergence criteria are well known to those skilled in the art. As an example, the convergence criterion 115 is satisfied when the algorithm is repeated for a predetermined number of iterations. Alternatively, the convergence criterion 115 can specify that the algorithm is terminated if the mean square difference between the new candidate deblurred image 113 and the candidate deblurred image 107 is less than a predetermined threshold, but is terminated after the algorithm is repeated for a predetermined number of iterations even if the mean square difference condition is not satisfied.

If the convergence criterion 115 has not been satisfied, the candidate deblurred image 107 is updated to be equal to the new candidate deblurred image 113. If the convergence criterion 115 has been satisfied, a deblurred image 116 is set to be equal to the new candidate deblurred image 113. A store deblurred image step 117 is then used to store the resulting deblurred image 116 in a processor-accessible memory. The processor-accessible memory is any type of digital storage such as RAM or a hard disk.

In a preferred embodiment of the present invention, the deblurred image 116 is determined using a Bayesian inference method with Maximum-A-Posterior (MAP) estimation. Using the method, the deblurred image 116 is determined by defining an energy function of the form:

$$E(L)=(L \otimes K-B)^2+\lambda D(L) \qquad (7)$$

where L is the deblurred image 116, K is the blur kernel 106, B is the captured image 510, $\otimes$ is the convolution operator, D(L) is the combined differential image 111 and $\lambda$ is a weighting coefficient In a preferred embodiment of the present invention the combined differential image 111 is computed using the following equation:

$$D(L) = \sum_j w_j (\partial_j L)^2 \qquad (8)$$

where j is an index value, $\partial_j$ is a differential operator corresponding to the $j^{th}$ index, $w_j$ is a pixel-dependent weighting factor which will be described in more detail later.

Figure 8:
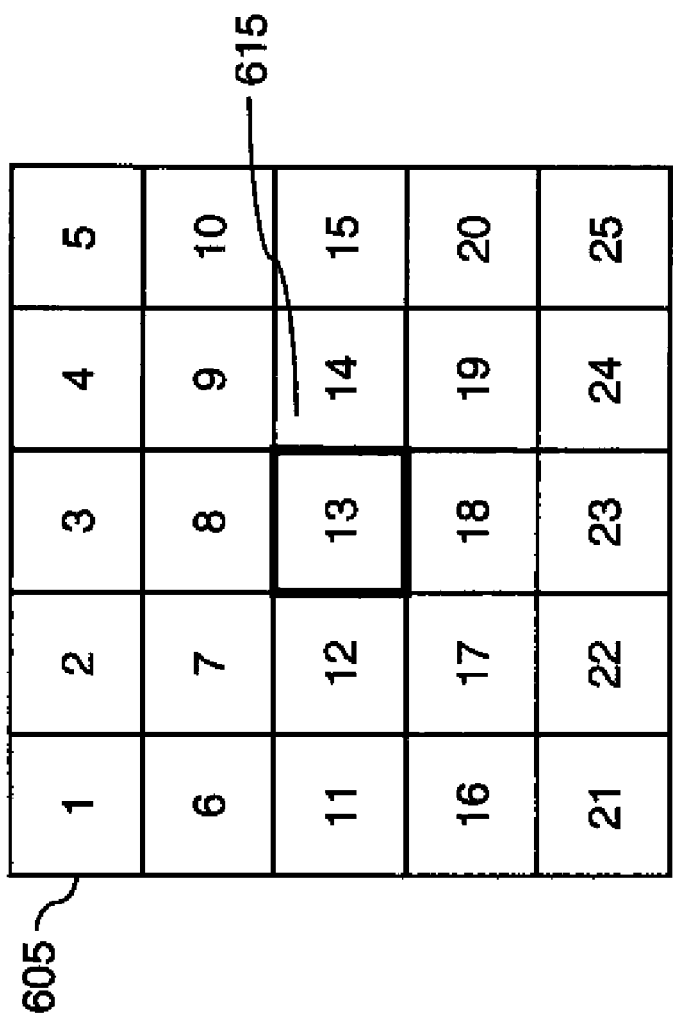
FIG. 8 is a schematic showing an array of indices centered on a current pixel location according to one embodiment of the present invention.

The index j is used to identify a neighboring pixel for the purpose of calculating a difference value. In a preferred embodiment of the present invention difference values are calculated for a 5×5 window of pixels centered on a particular pixel. FIG. 8 shows an array of indices 605 centered on a current pixel location 615. The numbers shown in the array of indices 605 are the indices j. For example, an index value of j=6 corresponds to a top pixel that is 1 row above and 2 columns to the left of the current pixel location 615.

The differential operator $\partial_j$ determines a difference between the pixel value for the current pixel, and the pixel value located at the relative position specified by the index j. For example, $\partial_6 S$ would correspond to a differential image determined by taking the difference between each pixel in the deblurred image L with a corresponding pixel that is 1 row above and 2 columns to the left. In equation form this would be given by:

$$\partial_j L = L(x,y) - L(x - \Delta x_j, y - \Delta y_j) \quad (9)$$

where $\Delta x_j$ and $\Delta y_j$ are the column and row offsets corresponding to the $j^{th}$ index, respectively. It will generally be desirable for the set of differential images $\partial_j L$ to include one or more horizontal differential images representing differences between neighboring pixels in the horizontal direction and one or more vertical differential images representing differences between neighboring pixels in the vertical direction, as well as one or more diagonal differential images representing differences between neighboring pixels in a diagonal direction.

In a preferred embodiment of the present invention, the pixel-dependent weighting factor $w_j$ is determined using the following equation:

$$w_j = (w_d)_j (w_p)_j \quad (10)$$

where $(w_d)_j$ is a distance weighting factor for the $j^{th}$ differential image, and $(w_p)_j$ is a pixel-dependent weighting factor for the $j^{th}$ differential image.

The distance weighting factor $(w_d)_j$ weights each differential image depending on the distance between the pixels being differenced:

$$(w_d)_j = G(d) \quad (11)$$

where $d = \sqrt{\Delta x_j^2 + \Delta y_j^2}$ is the distance between the pixels being differenced, and $G(\bullet)$ is weighting function. In a preferred embodiment, the weighting function $G(\bullet)$ falls off as a Gaussian function so that differential images with larger distances are weighted less than differential images with smaller distances.

The pixel-dependent weighting factor $(w_p)_j$ weights the pixels in each differential image depending on their magnitude. For reasons discussed in the aforementioned article "Image and depth from a conventional camera with a coded aperture" by Levin et al., it is desirable for the pixel-dependent weighting factor w to be determined using the equation:

$$(w_p)_j = |\partial_j L|^{\alpha - 2} \quad (12)$$

where $|\bullet|$ is the absolute value operator and $\alpha$ is a constant (e.g., 0.8). During the optimization process, the set of differential images $\partial_j L$ is calculated for each iteration using the estimate of L determined for the previous iteration.

The first term in the energy function given in Eq. (7) is an image fidelity term. In the nomenclature of Bayesian inference, it is often referred to as a "likelihood" term. It is seen that this term will be small when there is a small difference between the captured image 510 (B) and a blurred version of the candidate deblurred image (L) which as been convolved with the blur kernel 106 (K).

The second term in the energy function given in Eq. (7) is an image differential term. This term is often referred to as an "image prior." The second term will have low energy when the magnitude of the combined differential image 111 is small. This reflects the fact that a sharper image will generally have more pixels with low gradient values as the width of blurred edges is decreased.

The update candidate deblurred image step 112 computes the new candidate deblurred image 113 by reducing the energy function given in Eq. (7) using optimization methods that are well known to those skilled in the art. In a preferred embodiment of the present invention, the optimization problem is formulated as a PDE given by:

$$\frac{\partial E(L)}{\partial L} = 0. \quad (13)$$

which is solved using conventional PDE solvers. In a preferred embodiment of the present invention, a PDE solver is used where the PDE is converted to a linear equation form that is solved using a conventional linear equation solver, such as a conjugate gradient algorithm. For more details on solving PDE solvers, refer to the aforementioned article by Levin et al. It should be noted that even though the combined differential image 111 is a function of the deblurred image L, it is held constant during the process of computing the new candidate deblurred image 113. Once the new candidate deblurred image 113 has been determined, it is used in the next iteration to determine an updated combined differential image 111.

Figure 9:
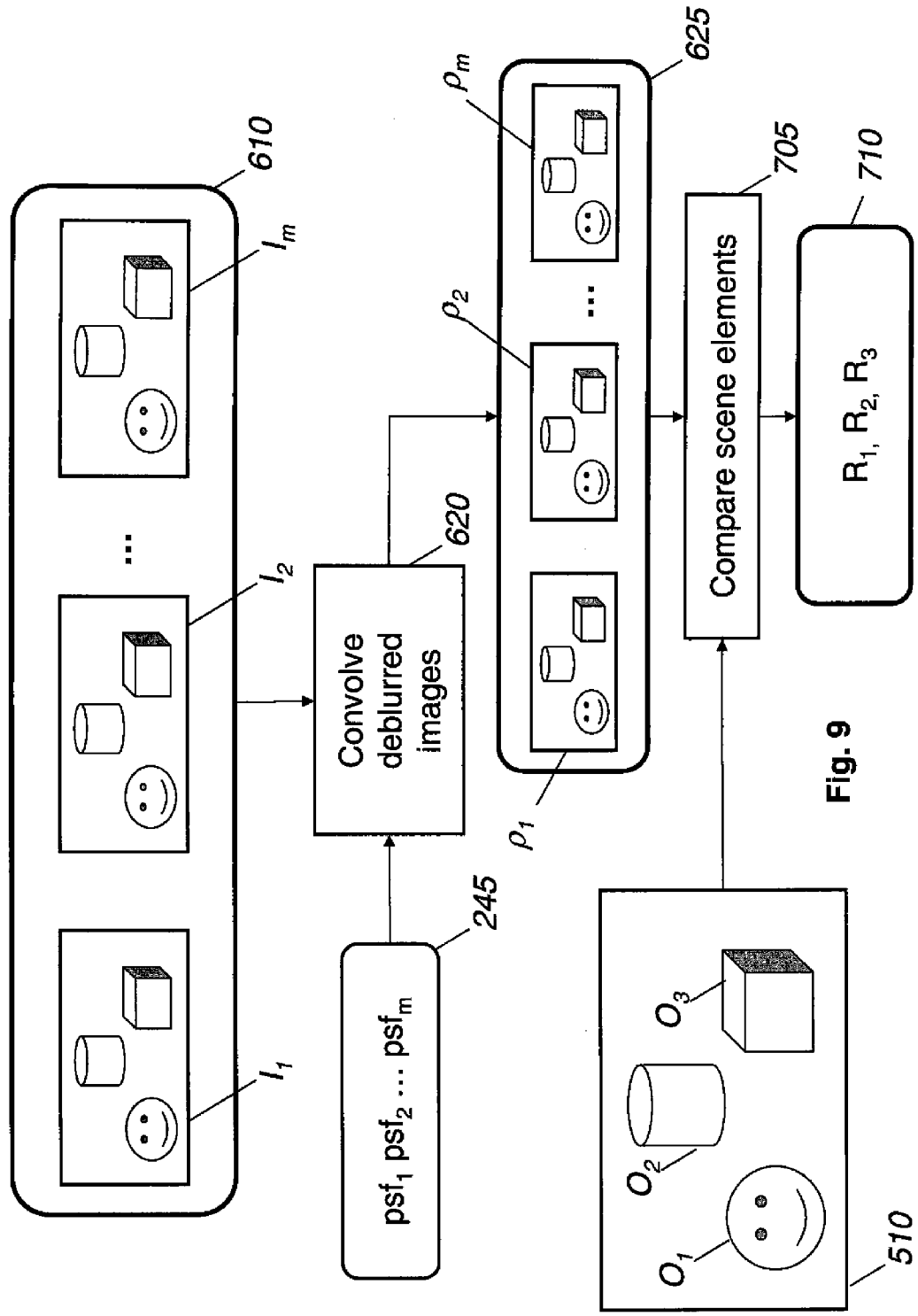
FIG. 9 is a process diagram illustrating a method for processing a deblurred image set to determine the range information for objects in a scene, according to one embodiment of the present invention.

FIG. 9 shows a process diagram in which the deblurred image set 610 is processed to determine the range information 710 for the objects in the scene, in accord with one embodiment of the present invention. In this arrangement, a Convolve deblurred images step 620 is used to digitally convolve each member $[I_1, I_2, \ldots I_m]$ of the deblurred image set 610 with the corresponding member of the set of digitally represented psfs 245. The Convolve deblurred images step 620 uses digital convolution algorithms known in the art. The result is a set of reconstructed images 625, whose elements are denoted $[\rho_1, \rho_2, \ldots \rho_m]$ In theory, each reconstructed image $[\rho_1, \rho_2, \ldots \rho_m]$ should be an exact match for the original captured image 510, since the convolution operation is the inverse of the deblurring, or deconvolution operation that was performed earlier. However, because the deconvolution operation is imperfect, no elements of the resulting reconstructed image set 625 are a perfect match for the captured image 510. However, scene elements reconstruct with higher fidelity when processed with psfs corresponding to a distance that more closely matches the distance of the scene element relative to the plane of camera focus, whereas scene elements processed with psfs corresponding to distances that differ from the distance of the scene element relative to the plane of camera focus exhibit poor fidelity and noticeable artifacts. With reference to FIG. 9, by comparing 705 the reconstructed image set 625 with the scene elements in the captured image 510, range values 710 are assigned by finding the closest matches between the scene elements in the captured image 510 and the reconstructed versions of those elements in the reconstructed image set 625. For example, scene elements $O_1$, $O_2$, and $O_3$ in the captured image 510 are compared 705 to their reconstructed versions in each element $[\rho_1, \rho_2, \ldots \rho_m]$ of the reconstructed image set 625, and assigned range values 710 of $R_1$, $R_2$, and $R_3$ that correspond to the known distances associated with the corresponding psfs that yield the closest matches.

The deblurred image set 610 is intentionally limited by using a subset of blur parameters from the stored set. This is done for a variety of reasons, such as reducing the processing time to arrive at the range values 710, or to take advantage of other information from the image capture device 210 indicating that the full range of blur parameters is not necessary. The set of blur parameters used (and hence the deblurred image set 610 created) are limited in increment (i.e. sub-sampled) or extent (i.e. restricted in range). If a digital image sequence is processed, the set of blur parameters used is the same, or different for each image in the sequence.

Alternatively, instead of sub-setting or sub-sampling the blur parameters from the stored set, a reduced deblurred image set is created by combining images corresponding to range values within selected range intervals. This might be done to improve the precision of depth estimates in a highly textured or highly complex scene which is difficult to segment. For example, let $z_m$, where m=1, 2, ... M denote the set of range values at which the psf data 245 and corresponding blur parameters have been measured. Let $\hat{i}_m(x,y)$ denote the deblurred image corresponding to range value m, and let $\hat{I}_m(v_x,v_y)$ denote its Fourier transform. For example, if the range values are divided into M equal groups or intervals, each containing M range values, a reduced deblurred image set is defined as:

$$\hat{i}_{red} = \left\{ \frac{1}{N}\sum_{m=1}^{N} \hat{i}_m(x,y); \frac{1}{N}\sum_{m=N+1}^{2N} \hat{i}_m(x,y); \frac{1}{N}\sum_{m=2N+1}^{3N} \hat{i}_m(x,y); \ldots \frac{1}{N}\sum_{m=(N/M)-N}^{N/M} \hat{i}_m(x,y); \right\} \quad (14)$$

In other arrangements, the range values are divided into M unequal groups. In another arrangement, a reduced blurred image set is defined by writing Eq. (14) in the Fourier domain and taking the inverse Fourier transform. In yet another arrangement, a reduced blurred image set is defined, using a spatial frequency dependent weighting criterion. Preferably this is computed in the Fourier domain using an equation such as:

$$\hat{I}_{red} = \left\{ \frac{1}{N}\sum_{m=1}^{N} w(v_x,v_y)\hat{I}_m(v_x,v_y); \frac{1}{N}\sum_{m=N+1}^{2N} w(v_x,v_y)\hat{I}_m(v_x,v_y); \ldots \frac{1}{N}\sum_{m=(N/M)-N}^{N/M} w(v_x,v_y)\hat{I}_m(v_x,v_y); \right\} \quad (15)$$

where $w(v_x,v_y)$ is a spatial frequency weighting function. Such a weighting function is useful, for example, in emphasizing spatial frequency intervals where the signal-to-noise ratio is most favorable, or where the spatial frequencies are most visible to the human observer. In some arrangements, the spatial frequency weighting function is the same for each of the M range intervals however, in other arrangements, the spatial frequency weighting function is different for some of the intervals.

Figure 10:
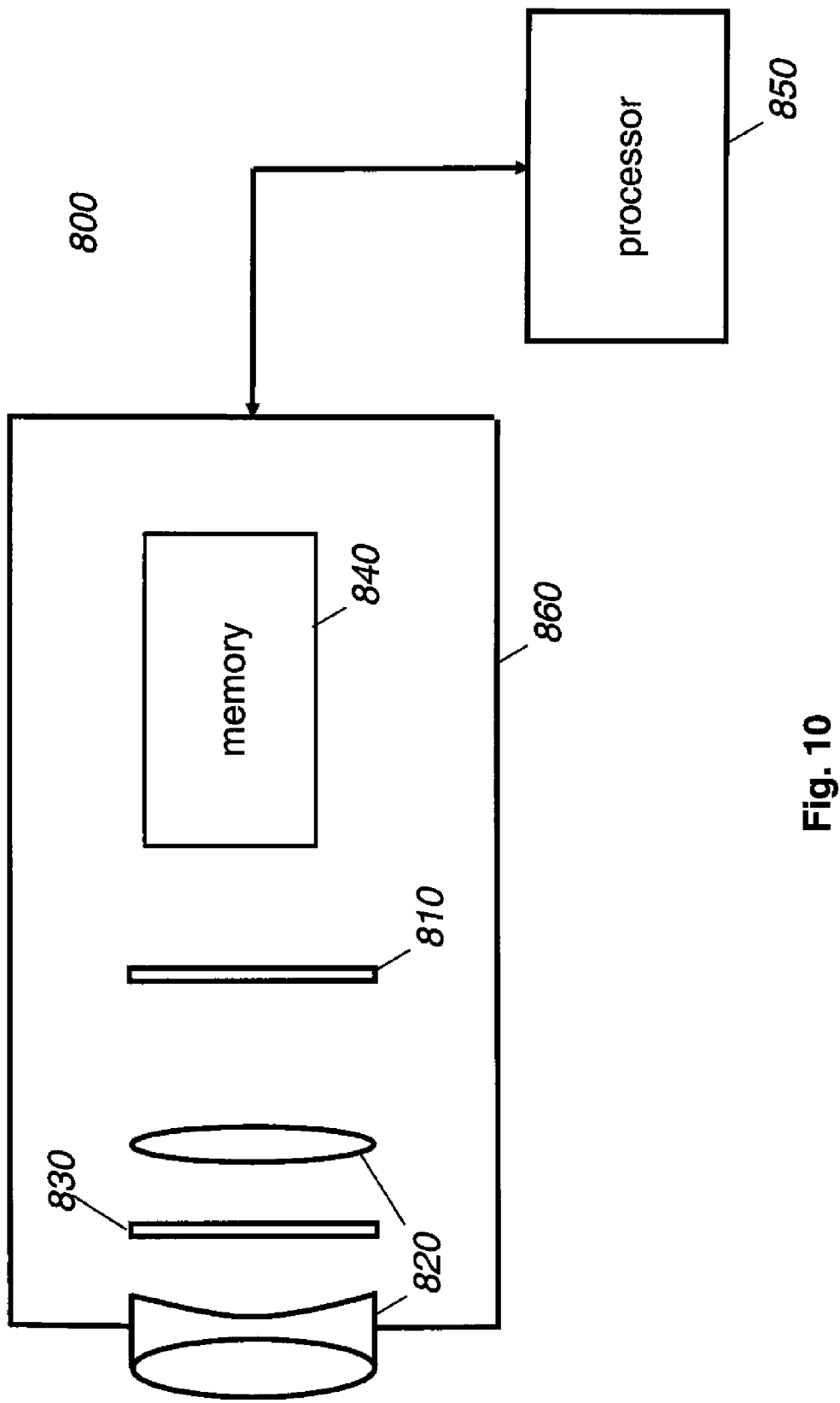
FIG. 10 is a schematic of a digital camera system according to one embodiment of the present invention.

FIG. 10 is a schematic of a digital camera system 800 in accordance with the present invention. The digital camera system 800 includes an image sensor 810 for capturing one or more images of a scene, a lens 820 for imaging the scene onto the sensor, a coded aperture 830, a processor-accessible memory 840 for storing a set of blur parameters derived from range calibration data, all inside an enclosure 860, and a data processing system 850 in communication with the other components, for producing a set of reference edge images using the blur parameters from the stored set, and for providing a set of deblurred images using the captured images, the reference edges and each of the blur parameters from the stored set, and for using the set of deblurred images to determine the range information for the objects in the scene. The data processing system 850 is a programmable digital computer that executes the steps previously described for providing a set of deblurred images using captured images and each of the blur parameters from the stored set. In other arrangements, the data processing system 850 is inside the enclosure 860, in the form of a small dedicated processor.

The invention has been described in detail with particular reference to certain preferred embodiments thereof, but it will be understood that variations and modifications can be effected within the spirit and scope of the invention.

PARTS LIST $s_1$ Distance
$s_2$ Distance
$s_1'$ Image Distance
$s_2'$ Image Distance
$P_1$ On-Axis Point
$P_2$ On-Axis Point
$P_1'$ Image Point
$P_2'$ Image Point
D Diameter
d Distance
F Focal Plane
$R_0$ Object Distance
$D_1$ Planes
$D_2$ Planes
$O_1, O_2, O_3$ Scene Elements
$\rho_1, \rho_2, \ldots \rho_m$ Reconstructed Image Elements
$I_1, I_2, \ldots I_m$ Image Set Elements
10 Lens
20 Axial ray
22 Axial ray
24 Axial ray
26 Axial ray
30 Lens
32 Binary transmittance mask
34 Lens
80 Compute reference edges step
85 Reference edges set
90 Compute blur kernels step
95 Image edges
100 Adjusted blur kernels
102 Receive blurred image step
103 Locate edges step
104 Initialize candidate deblurred image step
106 Blur kernel
105 Receive blur kernels step
107 Candidate deblurred image
108 Compute differential images step
109 Differential images
110 Compute combined differential image step
111 Combined differential image
112 Update candidate deblurred image step
113 New candidate deblurred image
114 Convergence test
115 Convergence criterion
116 Deblurred image
117 Store deblurred image step
200 Provide image capture device step
210 Image capture device
215 Lens
220 Coded aperture
225 Electronic sensor array
230 Memory
235 Blur parameters
245 Point spread functions (psf)
250 Condenser optics
255 Light ray
260 Light ray
265 Light source
300 Store blur parameters step
400 Capture image step 500 Produce reference edges step
510 Captured image
600 Provide set of deblurred images step
605 Array of indices
610 Deblurred image set
615 Current pixel location
620 Convolve deblurred images step
625 Reconstructed image set
700 Determine range information step
705 Compare scene elements step
710 Range Information
800 Digital camera system
810 Image sensor
820 Lens
830 Coded aperture
840 Memory
850 Processor
860 Enclosure

The invention claimed is:

1. A method of using an image capture device to identify range information for objects in a scene, comprising:
   a) providing an image capture device having an image sensor, a coded aperture having circular symmetry, and a lens;
   b) storing in a memory a set of blur parameters derived from range calibration;
   c) capturing an image of the scene having a plurality of objects;
   d) producing a set of reference edge images using the blur parameters from the stored set;
   e) providing a set of deblurred images using the captured image, the reference edges and each of the blur parameters from the stored set, including, for each deblurred image,
   i) locating edges in the captured image of the scene;
   ii) forming a blur kernel estimate, based on the located edges and the set of reference edge images;
   iii) using the blur kernel estimate to initialize a candidate blurred image;
   iv) producing a plurality of differential images representing differences between neighboring pixels in the candidate deblurred image;
   v) producing a combined differential image by combining the differential images;
   vi) updating the candidate deblurred image responsive to the captured image, the blur kernel estimate, the candidate deblurred image and the combined differential image; and
   vii) repeating steps iii)-vi) until a convergence criterion is satisfied;
   and
   f) using the set of deblurred images to determine the range information for the objects in the scene.

2. The method of claim 1, wherein step c) includes capturing a sequence of digital images.

3. The method of claim 2, wherein step f) includes determining range information for each image in the sequence.

4. The method of claim 2, wherein step f) includes determining range information for a subset of images in the sequence.

5. The method of claim 2, wherein the range information is used to identify stationary and moving objects in the scene.

6. The method of claim 5, wherein the range information is used by the image capture device to track moving objects.

7. The method of claim 2, wherein the step of initializing a candidate deblurred image includes:
   a) producing a difference image between the current and previous image in the image sequence; and
   b) initializing a candidate deblurred image responsive to the difference image.

8. The method of claim 7, wherein step f) includes determining range information for the objects in the scene, responsive to the difference image.

9. The method of claim 1, wherein step e) includes using a subset of blur parameters from the stored set.

10. The method of claim 1, wherein step b) includes using a set of blur parameters derived from calibration data at a set of range values, such that there is a set of blur parameters associated with each corresponding range value.

11. The method of claim 1, wherein step b) includes storing a subset of blur parameters derived from calibration data at a set of range values, responsive to information provided by the capture device.

12. A digital camera system comprising:
   a) an image sensor for capturing one or more images of a scene;
   b) a lens for imaging the scene onto the image sensor;
   c) a coded aperture having circular symmetry;
   d) a processor-accessible memory for storing a set of blur parameters derived from range calibration data; and
   e) a data processing system for producing a set of reference edge images using the blur parameters from the stored set, for providing a set of deblurred images using the captured images, the reference edges and each of the blur parameters from the stored set by,
   i) locating edges in the captured image of the scene;
   ii) forming a blur kernel estimate, based on the located edges and the set of reference edge images;
   iii) using the blur kernel estimate to initialize a candidate blurred image;
   iv) producing a plurality of differential images representing differences between neighboring pixels in the candidate deblurred image;
   v) producing a combined differential image by combining the differential images;
   vi) updating the candidate deblurred image responsive to the captured image, the blur kernel estimate, the candidate deblurred image and the combined differential image; and
   vii) repeating steps iii)-vi) until a convergence criterion is satisfied; and
   for using the set of deblurred images to determine the range information for the objects in the scene.

13. A method of using an image capture device to identify range information for objects in a scene, comprising:
   a) providing an image capture device having an image sensor, a coded aperture having circular symmetry, and a lens;
   b) storing in a memory a set of blur parameters computed from images captured with the coded aperture and a point light source at a series of range values;
   c) capturing an image of the scene having a plurality of objects;
   d) producing a set of reference edge images using the blur parameters from the stored set;
   e) providing a set of deblurred images using the captured image, the reference edges and each of the blur parameters from the stored set;
   and
   f) using the set of deblurred images to determine the range information for the objects in the scene.

14. A method of using an image capture device to identify range information for objects in a scene, comprising:

a) providing an image capture device having an image sensor, a coded aperture having circular symmetry, and a lens;
b) storing in a memory a set of blur parameters derived from range calibration;
c) capturing an image of the scene having a plurality of objects;
d) producing a set of reference edge images using the blur parameters from the stored set;
e) providing a set of deblurred images using the captured image, the reference edges and each of the blur parameters from the stored set;
and
f) using the set of deblurred images to determine the range information for the objects in the scene, wherein deblurred images resulting from blur parameters corresponding to range values within a selected interval are combined.

15. A method of using an image capture device to identify range information for objects in a scene, comprising:

a) providing an image capture device having an image sensor, a coded aperture having circular symmetry, and a lens;
b) storing in a memory a set of blur parameters derived from range calibration;
c) capturing an image of the scene having a plurality of objects;
d) producing a set of reference edge images using the blur parameters from the stored set;
e) providing a set of deblurred images using the captured image, the reference edges and each of the blur parameters from the stored set;
and
f) using the set of deblurred images to determine the range information for the objects in the scene, wherein deblurred images resulting from blur parameters corresponding to range values within a selected interval are combined according to a spatial-frequency dependent weighting criterion.

* * * * *